Inventor
Martin Zirmer
By Thomas Bilyeu
Attorney

Jan. 12, 1932.    M. ZIRMER    1,840,761
CONSTRUCTION FOR CLOSED VEHICLES
Filed Jan. 12, 1929    2 Sheets-Sheet 2

Martin Zirmer
INVENTOR

BY
ATTORNEY

Patented Jan. 12, 1932

1,840,761

UNITED STATES PATENT OFFICE

MARTIN ZIRMER, OF PORTLAND, OREGON

CONSTRUCTION FOR CLOSED VEHICLES

Application filed January 12, 1929. Serial No. 332,127.

My invention relates to closed body construction for automotive vehicles, as automobiles, automobile trucks, motor boats, and the like and has for its object the breaking of the glare of the approaching vehicle by the placing of the front glass, or wind shield glass at an angle sufficient to throw the glare of the approaching headlight out of vision of the driver through refraction within the glass. The wind shield glass being inclined rearwardly at an angle. A further object to be accomplished is to limit the size of the corner posts in the door created by the inclination, by moving the window glass disposed within the door horizontally as well as vertically during the raising and lowering operation.

The primary purpose of my invention is to limit the glare of the approaching headlight and to limit the size of the corner post construction of the automobile body.

A further object of my invention resides in a simplified construction that makes possible the moving of the window glass horizontally and vertically during the raising and lowering operation.

A further object of my invention resides in a simplified construction having a minimum first cost and arranged to give a minimum operating annoyance over a relatively long operating period.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

Like reference characters refer to like parts throughout the several views.

Figure 1:
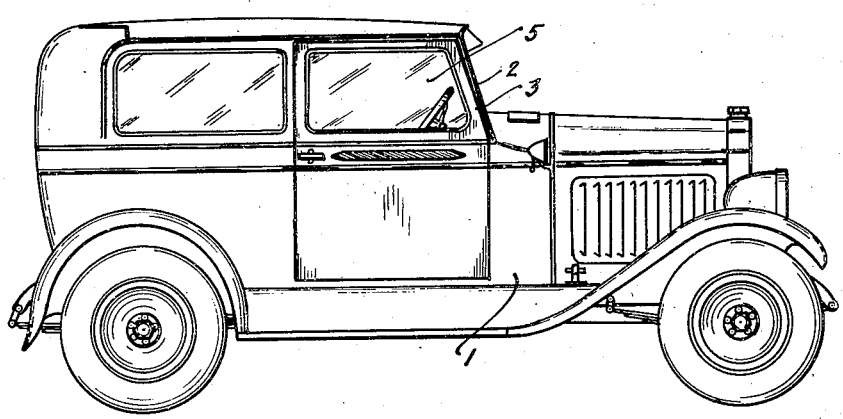
Fig. 1 is a side view of a motor vehicle utilizing my form of construction.
Figure 4:
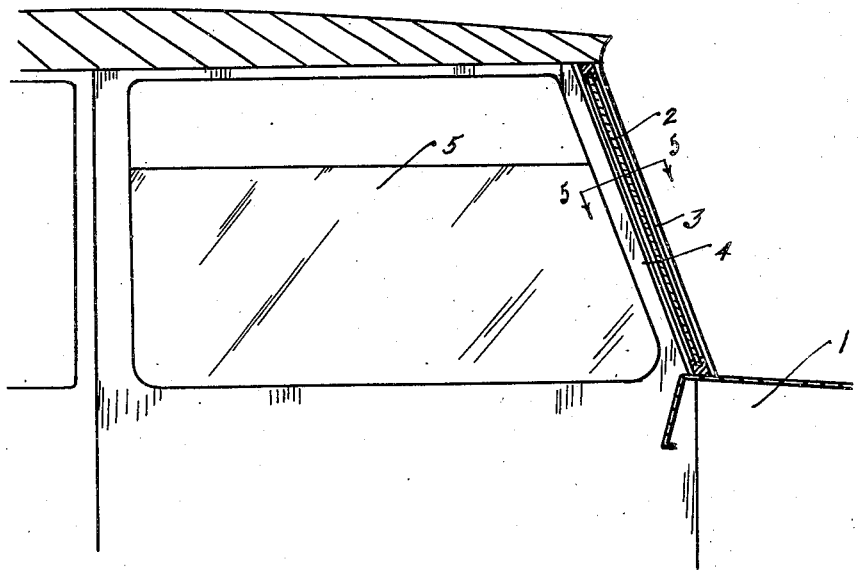
Fig. 4 is a fragmentary, sectional, side view of the vehicle body wind shield section, and illustrating the window in a partially raised position.

1 is the automotive body, having a wind shield 2 disposing at an angle sufficient to break the glare of the approaching headlight and the same is made of relatively heavy plate glass, the refraction caused by the light rays passing through the wind shield glass throws the light rays above the vision of the driver of the motor vehicle. Heretofore this has not been possible, due to the inclination increasing the size of the corner post 3 of the motor vehicle.

In my new and improved construction, I incline the front upper wall of the door 4, at an angle substantially that of the wind shield and place a glass 5 within the door having the upper portion 6 of the front edge inclined at the angle of inclination of the upper door frame bifurcated guideway 7 and having the lower portion 8 of the front edge of the window glass substantially vertical so that when the glass is lowered the front wall will contact the lower door frame bifurcated guideway 9 in which the same is placed. I also form the upper rear portion of the glass 10 substantially vertical and form the lower portion 11 of the rear edge of the glass at an angle also substantially that of the upper rearwardly inclined bifurcated guideway 12 of the door frame. The glass is raised and lowered in the usual manner by a chain 13 by suitable operating cranks disposed upon the inner side of the door.

Figure 2:
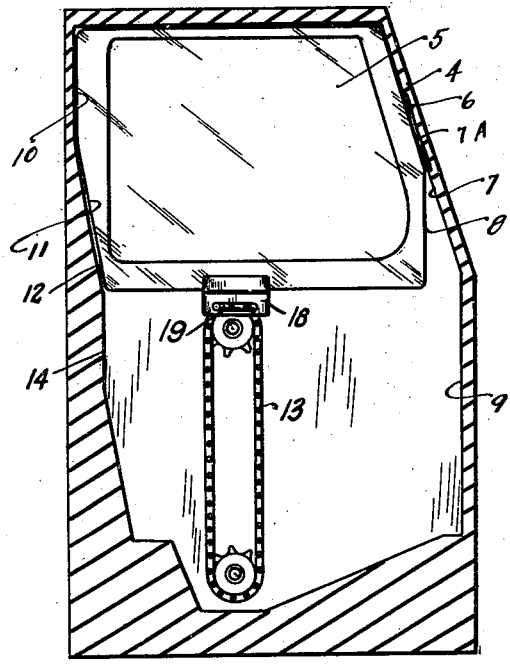
Fig. 2 is a fragmentary, sectional, side view of a vehicle door illustrating the window in full raised position.
Figure 3:
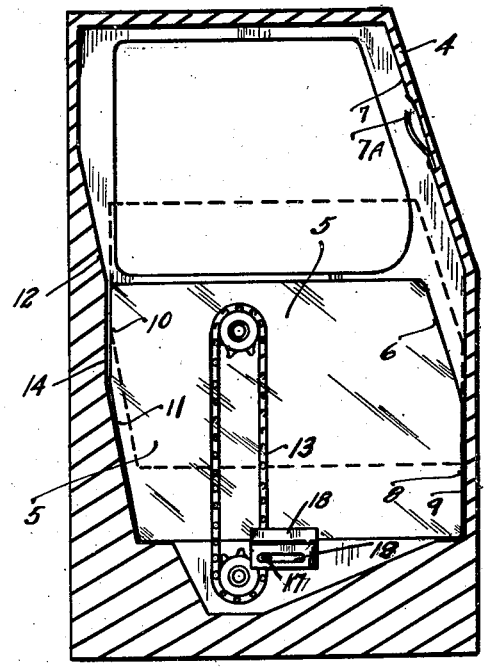
Fig. 3 is a longitudinal, sectional, side view of a vehicle door illustrating the window glass in full lowered position.
Figure 5:
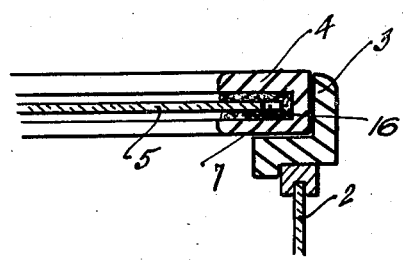
Fig. 5 is a sectional view, taken on line 5—5 of Fig. 4, looking in the direction indicated, the same being made to illustrate the corner post construction and the door frame construction, showing the felt lining disposed within the guideways of the door frame.

As the glass 5 is raised the inclined surface 6 is disposed on the forward edge of the glass contacts with the inner wall of the bifurcated guideway 7 of the door frame and causes the glass to be shifted rearwardly. To prevent the rattling of the glass, a spring 7A is disposed upon the inner surface of the bifurcated guideway 7 and as the sloping surface of the glass contacts with the spring 7A, the same is repressed until the spring will occupy the position, as illustrated in Fig. 2. In the lowering of the window glass, the inner wall of the guideways 7 and 12 of the door frame contact with the sloping surfaces 6 and 10 of the glass and move the same horizontally, simultaneously with the lowering and raising operation until the vertical wall 8 of the glass contacts with the inner vertical wall of the bifurcated guideway 9 of the door and the vertical wall 10 of the glass contacts with the inner vertical wall of the bifurcated guideway 15 of the door frame, thereby lowering the glass vertically in the final lowering operation. The precision fits between the glass and the guideways of the door frame, prevents rattling during the lowering operation after the glass has been partially lowered and the precision fit between the glass and the guideways when the glass is totally raised, prevents rattling, the spring 7A preventing rattling during the period of the glass being partially raised. The movement of the glass horizontally to compensate for the inclination of the forward wall of the door frame, reduces the front corner post of the door frame to a minimum in size. A suitable felt lining 16 may be placed within the bifurcated guideways of the door frame to prevent annoying rattles in the customary manner. The chain 13 carries an outwardly projecting pin 17. The engagement block 18 is secured to the lower surface of the glass and the pin 17 actuates within the slot 19 disposed within the block 18 and as the glass is raised and lowered within the guideways of the frame, the length of the slot 19 should be sufficient to compensate for the horizontal movement of the glass.

While the form of mechanism herein shown and described is admirably adapted to fulfill the objects primarily stated, it is to be understood that it is not intended to confine the invention to the one form of embodiment herein shown in various forms, all coming within the scope of the claim which follows:

What I claim is:

In a device of the class described, in combination, a door frame, said door frame having its upper front edge inclined at an angle substantially that of the windshield frame, its lower front edge vertical, its rear edge parallel to the lower front edge, a bifurcated channel disposed within the inner portion of the door frame, said inner portion of the door frame and channel following the contour of the front edge and top of the door frame, the inner rear portion of the door frame being shaped in zig-zag form being first vertical, then inclined at an angle equal to that of the front edge of the frame then again vertical, and then again inclined at an angle equal to that of the front edge of the frame, and a window pane shaped substantially like the inner portion of the door frame and adapted to ride within the channel by the actuation of driving means.

MARTIN ZIRMER.